United States Patent
Joseph

(10) Patent No.: US 10,315,536 B1
(45) Date of Patent: Jun. 11, 2019

(54) SEAT BELT HOLDING CLIP

(71) Applicant: Amarys Ites Joseph, Vancouver (CA)

(72) Inventor: Amarys Ites Joseph, Vancouver (CA)

( * ) Notice: Subject to any disclaimer, the term of this patent is extended or adjusted under 35 U.S.C. 154(b) by 0 days.

(21) Appl. No.: 15/788,738

(22) Filed: Oct. 19, 2017

Related U.S. Application Data

(60) Provisional application No. 62/423,930, filed on Nov. 18, 2016.

(51) Int. Cl.
| | |
|---|---|
| *A47D 15/00* | (2006.01) |
| *B60R 22/10* | (2006.01) |
| *A44B 6/00* | (2006.01) |
| *B60N 2/28* | (2006.01) |

(52) U.S. Cl.
CPC .... *B60N 2/2806* (2013.01); *B60N 2002/2815* (2013.01); *B60N 2002/2818* (2013.01)

(58) Field of Classification Search
CPC .......... B60N 2/2806; B60N 2002/2818; B60N 2002/2815
USPC ....................................................... 297/481
See application file for complete search history.

(56) References Cited

U.S. PATENT DOCUMENTS

| | | | | |
|---|---|---|---|---|
| 6,305,745 | B1 * | 10/2001 | Rijsdijk ............... | B60N 2/2806 297/250.1 |
| 8,328,289 | B2 * | 12/2012 | Tharp ................... | B60N 2/2812 297/481 X |
| 8,465,102 | B2 * | 6/2013 | Morrissey ............ | B60N 2/2812 297/250.1 |
| 8,608,246 | B1 * | 12/2013 | Teague ................. | B60N 2/2812 297/481 X |
| 8,845,032 | B2 * | 9/2014 | Bruce ................... | A47D 15/006 297/250.1 X |
| 9,399,417 | B1 * | 7/2016 | Grey ..................... | B60N 2/2845 |
| 9,713,968 | B1 * | 7/2017 | Richardson ........... | B60R 22/105 |
| 10,124,702 | B2 * | 11/2018 | Denbo .................. | B60N 2/2812 |
| 2005/0179289 | A1 * | 8/2005 | Fuller .................... | A47D 13/025 297/250.1 |
| 2011/0133528 | A1 * | 6/2011 | Keith .................... | B60N 2/2803 297/216.11 |
| 2012/0284968 | A1 * | 11/2012 | Johnson ................ | H01F 7/0263 24/303 |

* cited by examiner

*Primary Examiner* — Rodney B White
(74) *Attorney, Agent, or Firm* — John D. Gugliotta

(57) ABSTRACT

The Seat Belt Holding clip is for holding the seat belt straps out of the way when placing individuals in and out of car seats and chairs. The Seat Belt Holding Clip's purpose is to help people with seat belt issues and keep it out of the way when not in use. It will work for harnesses or over the shoulder seat belts and can easily access the seat belt and secure it when needed. The Seat Belt Holder is primarily used for all types of car seats and devices with harnesses. The gripping clamp is used to hoist the belt out of the way by holding the belt itself and can be released by pressing the squeeze handles. The strap attached to the Seat Belt Holder is to attach the device to any particular object that it will be used on.

18 Claims, 8 Drawing Sheets

SEAT BELT HOLDING CLIP

RELATED APPLICATIONS

The present application claims benefit of U.S. Provisional Application 62/423,930, filed on Nov. 18, 2016 and incorporated by reference as if fully rewritten herein.

BACKGROUND OF THE INVENTION

1. Field of the Invention

The present invention relates generally to child car restraining safety seat systems and, more particularly, to an accessory for use with such safety seat systems that provides for the holding and positioning of car seat restraint straps in a preferred pre-latched position.

2. Description of the Related Art

A child safety seat are restraint systems designed specifically to protect children from injury or death during vehicle collisions. These seats are generally purchased and installed by consumers separate from the vehicle, but occasionally some car manufacturers may integrate child safety seats directly into their vehicle's design. Such car seats are legally required in many countries, including most Western developed countries, to safely transport children up to a certain age, body weight or height in cars and other vehicles. As such, vehicle's generally provide anchors and to ensure seat belt compatibility.

However, research indicates many child safety restraints are often not used properly. And, while seat belt save lives, they can only function properly if used correctly. Struggling and fumbling with seat belt straps can result in a significant amount of stress on both children and parents alike. Some children dread being buckled up so much that they respond by protesting and fighting back. This behavior often discourages the adults from traveling anywhere in the vehicle or can further facilitate improper use of such safety systems.

Some methods and devices are known that incorporate various mechanisms for aiding in the proper placement of seat belt restraints. For example:

U.S. Patent Publication 2013/0334852, published in the name of Miley, discloses a car seat strap tether apparatus and system car seat strap tether apparatus that includes a holder affixed to an arm member. The arm member removably couples the apparatus to a car seat. In some embodiments the arm member is selectively positioned to assist the holder in removably holding the car seat straps while the car seat is not being used. In some embodiments, the arm member is flexible and has sufficient memory to support the car seat straps without being deformed. In some embodiments, the holder alone removably holds the car seat straps while the car seat is not in use.

U.S. Patent Publication 2003/0218105, published in the name of Sones et al., discloses a baby bottle and accessory holding device for releasably holding a baby accessory, such as a baby bottle, including a flexible arm having a clamp attached to one end thereof for engagement with an existing object. A magnetic or metal member is attached to the arm generally opposite the clamp for magnetically coupling with a magnetic or metal member associated with the baby bottle or accessory. The magnetic or metal member may be fixed to the baby accessory, or fixed to a support configured to removably hold the baby accessory therein. The magnetic coupling withstands most common usage, while being easily broken by the infant to avoid choking.

And, in U.S. Pat. No. 8,608,246, issued in the name of Teague, discloses Safety belt holder The prior art discloses a two part safety belt holder for holding a safety belt away from a car seat. The first part comprises an attachment device for attaching the first part to a structure adjacent the seat, a body attached to the attachment device, and a connector first side attached to or embedded within the body. The second part is attachable to the safety belt and comprises a connector second side, which is removably attachable to the connector first side. In particular, the safety belt holder is suitable for use with an infant car seat with a five-point harness and a retractable handle.

In spite of these teachings, it has been a failure in the art to fail to address a preferred method of holding and positioning car seat straps during pre-use, namely from a position around the upper back of a car seat, while using components and materials that are child safe Consequently, a need has been felt for providing an improved apparatus and method for the holding and positioning of car seat restraint straps in a preferred pre-latched position.

SUMMARY OF THE INVENTION

It is thus an object of the present invention to provide an apparatus for and method of facilitating the proper use of child car restraining safety seat systems, It is a feature of the present invention to provide a device for holding and properly positioning of car seat restraint straps in a preferred pre-latched position.

Briefly described according to the preferred embodiment of the present invention a seatbelt holding clip provides a holding mechanism adapted for retention of a webbed belt. A clamping device assembly is attached to a tether, and the tether affixed to a backrest of a car seat at a positioned between a top of a backrest and a midpoint of the backrest such that a restraining harness may be tethered at a preferred a preferred pre-latched position that facilitates the easy installation of the harness in a proper configuration. The clamping device has a first jaw member pivotally hinged to a second jaw by a pin which serves as a traverse hinge axis. Each jaw member forms a linear grasping member that is generally laterally elongated about a lateral axis and forming a gripping surface at an inward facing face. A biasing spring provides an urging force for closing the first jaw member against the second jaw member. A terminal distal edge forms an overall perimeter characterized by curved corners. Each said linear grasping member further comprises a grasping tab extending from and angularly disposed with said from a proximal end of said lateral axis. Further, each linear grasping members together to form a gripping clamp having resilient pads affixed at each inner surface.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1A:
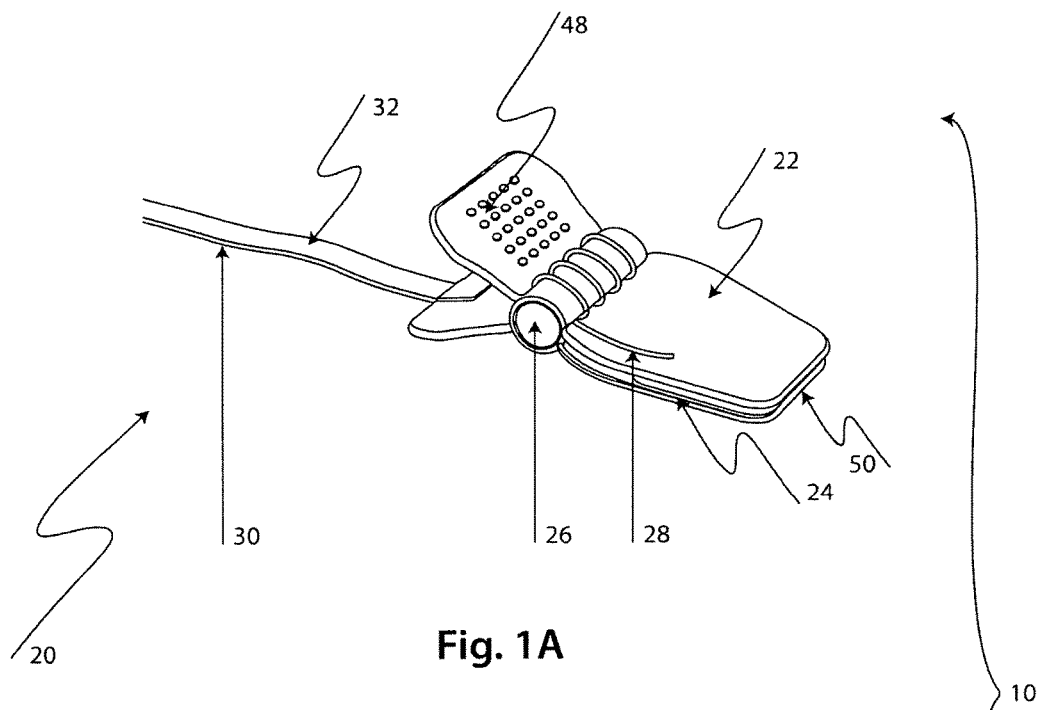
FIG. 1A is a perspective view of a holding mechanism 20.
Figure 1B:
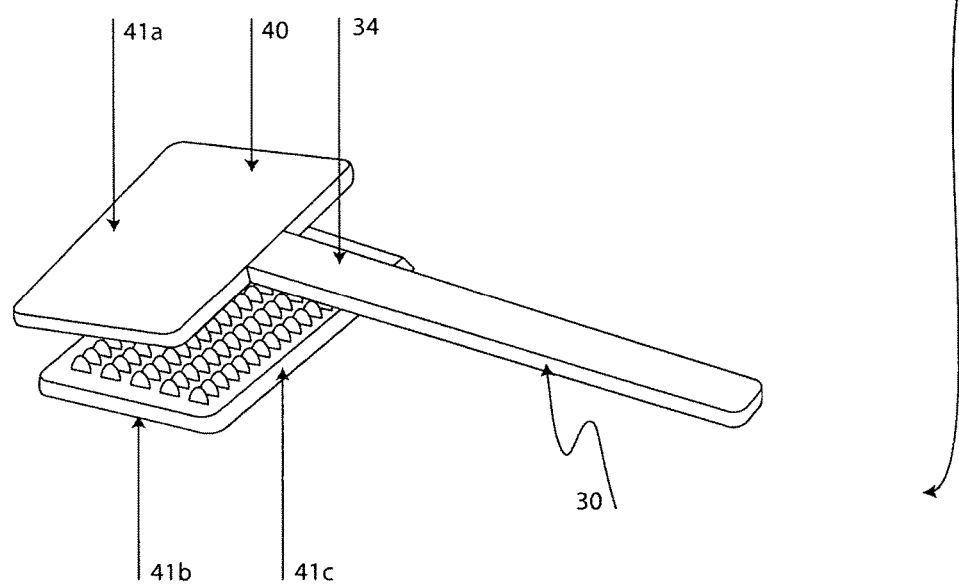
FIG. 1B is a perspective view of an attachment means 40, for use with the Seatbelt Holding Clip 10 according to the preferred embodiment.
Figure 2:
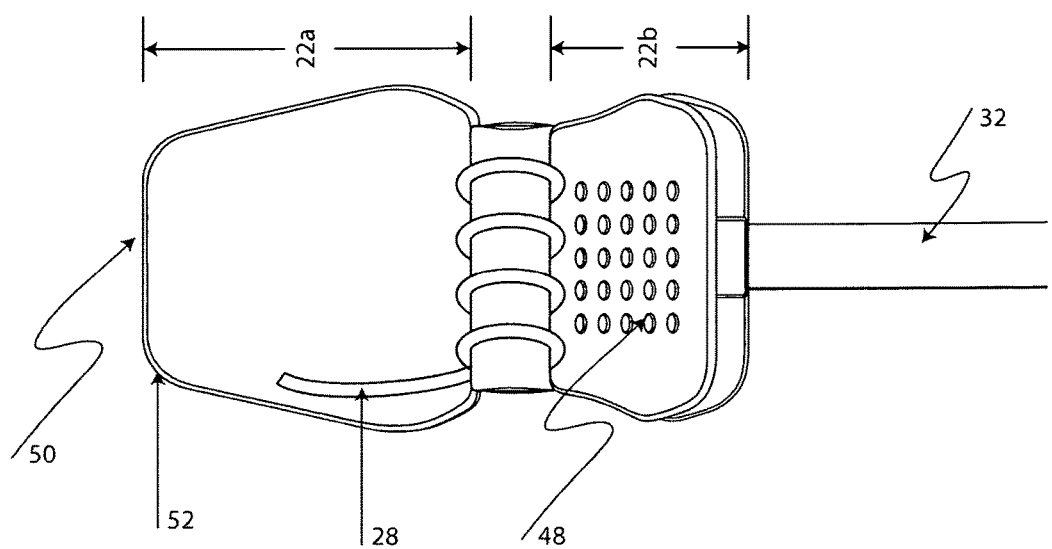
FIG. 2 is a partial top plan view thereof.
Figure 3:
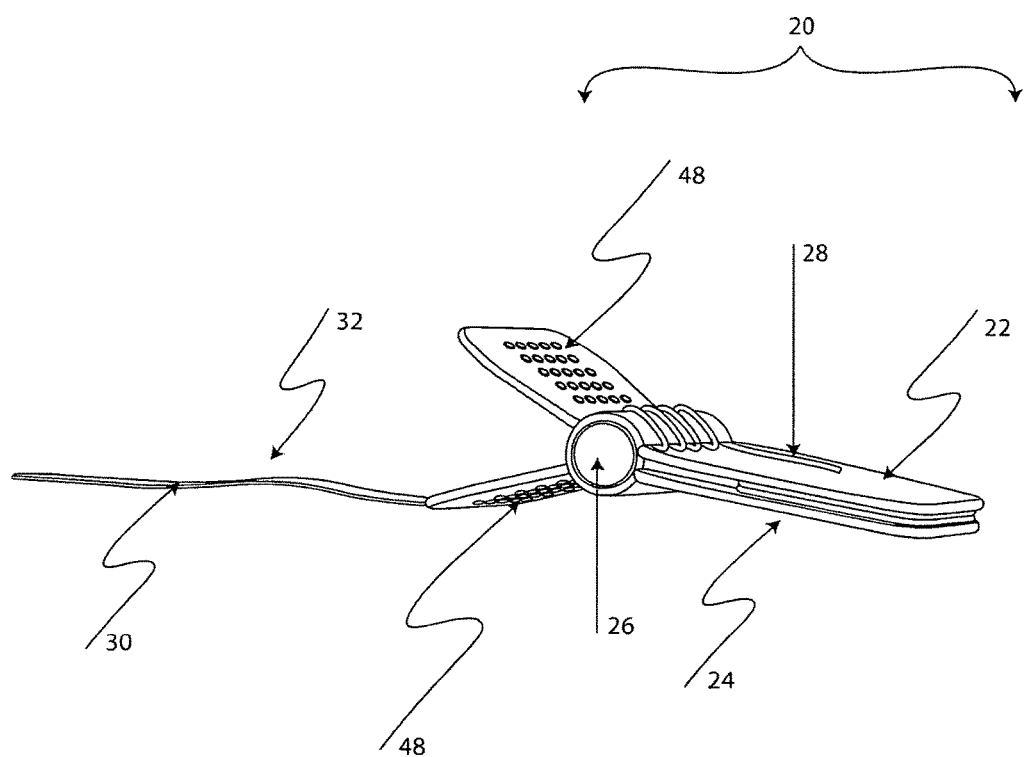
FIG. 3 is a right side view thereof shown in a closed configuration.
Figure 4:
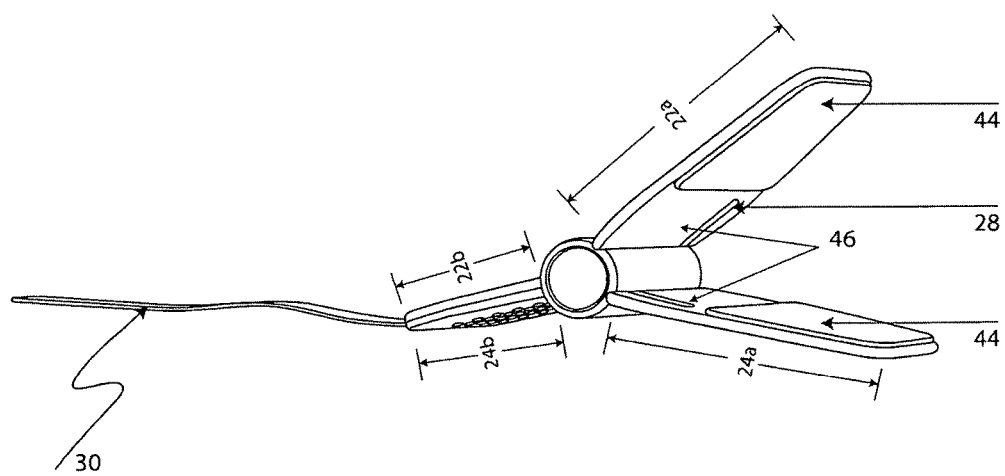
FIG. 4 is a right side view thereof shown in an open configuration.
Figure 5:
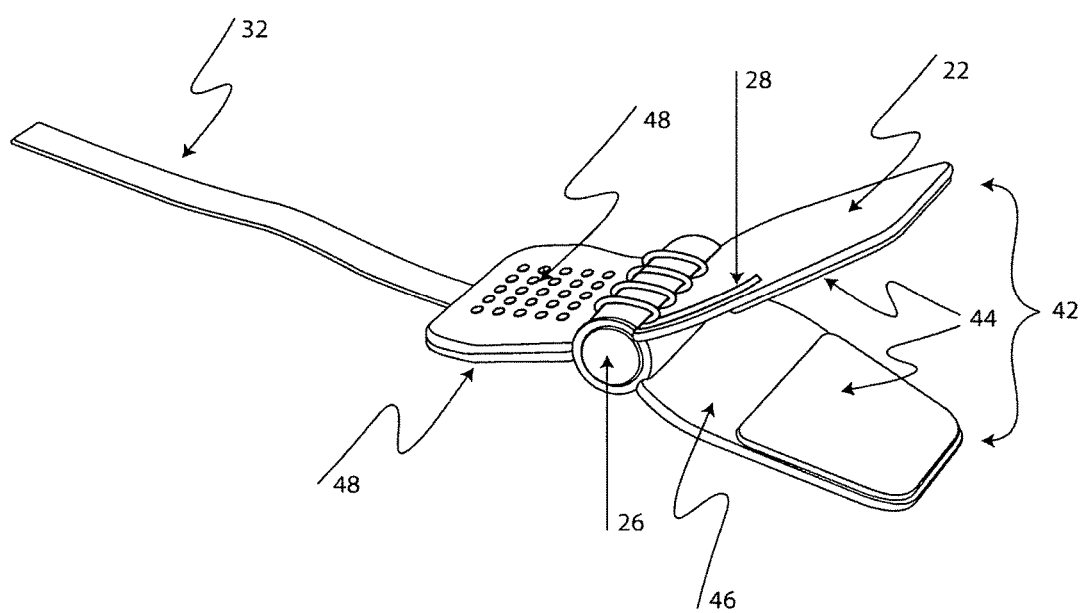
FIG. 5 is a front perspective view thereof shown in an open configuration.
Figure 6:
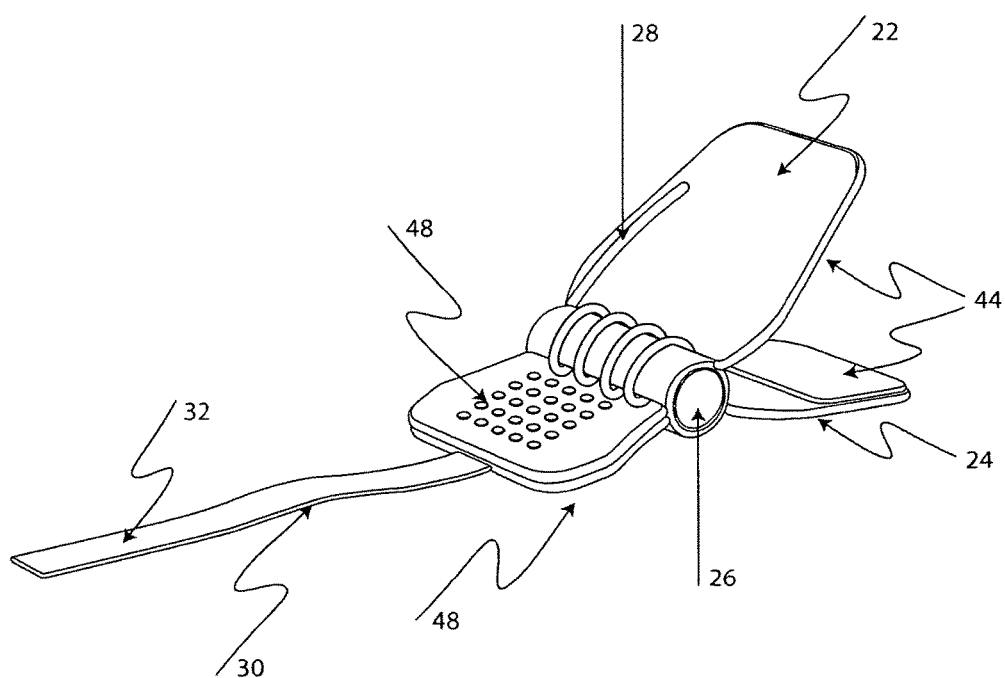
FIG. 6 is a rear perspective view thereof.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

Referring now to the drawings, wherein like reference numerals indicate the same parts throughout the several views, a Seatbelt Holding Clip, generally noted as 10, is shown according to the preferred embodiment of the present invention. The clip 10 consists essentially of a holding mechanism 20, a tether 30, and an attachment means 40.

The holding mechanism 20 forms generally a clamping device assembly of a first jaw member 22 and a second jaw member 24. The first jaw member 22 is pivotally hinged to the second jaw 24 by means of a pin 26 which serves as a traverse hinge axis. A biasing spring 28 provides an urging force for closing the first jaw 22 against the second jaw 24. According to one aspect of the present invention the spring 28 may be embedded into the jaws 22, 24 through overmolding or an equivalent construction. However, such an attachment mechanism is intended to be merely exemplary and is not intended to be limiting and, as such, any functionally equivalent method of providing such a biasing urging force between the jaws 22, 24.

Each jaw member 22, 24 forms a linear grasping member 22a, 24a respectively, that is generally laterally elongated about the apparatus's lateral axis and forms a gripping surface at each respective inward facing face 46. The distal edge of each jaw member 22, 24 forms a terminal edge 50 having an overall perimeter characterized by curved corners 52. Angularly disposed from each linear grasping member 22a, 24a is a grasping tab 22b, 24b respectively.

Each linear grasping member 22a, 22b are intended to engage together to form a gripping clamp 42 having resilient pads 44 affixed at each inner surface 46. Each resilient pad 44 may be of a grip enhancing material such as rubber, foam, or similar material functioning as a gripping cushion between the gripping clamps.

Each grasping tab 22b, 24b further forms a thumb grip in which a grip enhancing surface 48 is provided. The grip enhancing surface may be formed of knurling or different protrusions as an aligned array of detentes, or indents, in linear, geometric or arcuate patterns. According to another aspect of the present invention, the grip enhancing surface 48 may further function in the form of a tactile indicator, such as in a braille embossing or similar or equivalent manner.

Attaching to the second jaw grasping member 24b is one end of the linearly elongated tether 30. The tether 30 may be formed of a webbing or elastomeric material to provide for a flexible restraint. The tether 30 has a first end 32 opposite a second end 34. The first end 32 may be attached to the second jaw gasping member 24b. The attachment may be a permanent affixing through molding, adhesive, fasteners, or any other functionally equivalent manner. The attachment may alternately be a temporary attachment through impingement, fastener, or through tying or wrapping the first end 32 over the gasping member 24b or through and around an aperture or slot (not shown) formed therein.

Attached to the second end 34 of the tether 30 is the attachment means 40. The attachment means 40 and the termination of the second end 34 with the attachment means 40 are intended to aid in attachment of the seatbelt holding clip 10 via the tether 30 to the rear of a car seat in a manner that will be described in greater detail below. The attachment means 40 is shown herein as a hook and loop fastener element in which a hook fastener portion 41a is affixed to or integrated with the second end 34. A loop fastener portion 41b is provided that engages with the hook fastener portion 41a, and provides an attachment surface 41c, shown as an adhesive surface for affixing to a target surface. However, it should be apparent to a person having ordinary skill in the relevant art, I light of the present invention, that the attachment means 40 is and should be construed broadly within the widest range of functional equivalents, and is not and should not be interpreted as a limitation as would normally be implied in a "means plus function" recital under 35 U.S.C. § 112, sixth paragraph.

While the clip 10 at its most basic consists essentially of a holding mechanism 20, a tether 30, and an attachment means 40, it is envisioned that additional optional features may be included. One intended significant optional feature may include various appurtenances affixed to, positioned on, integrated with or interacting with an outer surface of the grasping member 22a of the first jaw member 22. By way of example, and not as a limitation, such options may comprise: decorative elements; images of licensed characters; shapes of animals, mammals or the like; or attraction or attention devices intended for small children. The later may include built in aesthetics such as an animal figure, TV personalities, personal embellishments, or can be in shaped like food, i.e. carrots, strawberries, etc. The later may also include noise makers (e.g. bells), musical noise maker or audio players for providing selected music (e.g. lullabies).

Further, other possible variations may be provide, such as:
   having the distal end 34 integrated with or directly attached to a car seat, stroller, high chair, and other toy or Universal chairs and seats that have harnesses;
   inclusion of magnetic attachment mechanisms;
   variations shape, such as round, square, rectangular, octagon, triangle, oval, and pentagon shape;
   utilizing of various materials such as fabric, foam, plastic, plexiglass, rubber, BPA free plastic, adipate, polyvinyl chloride, PBT plastic and foam material with a layer of fabric such as cotton, corduroy, or spandex;
   molding or use of various color, either for aesthetics or to make the device 10 immediately optically discernable.

2. Operation of the Preferred Embodiment

Figure 7:
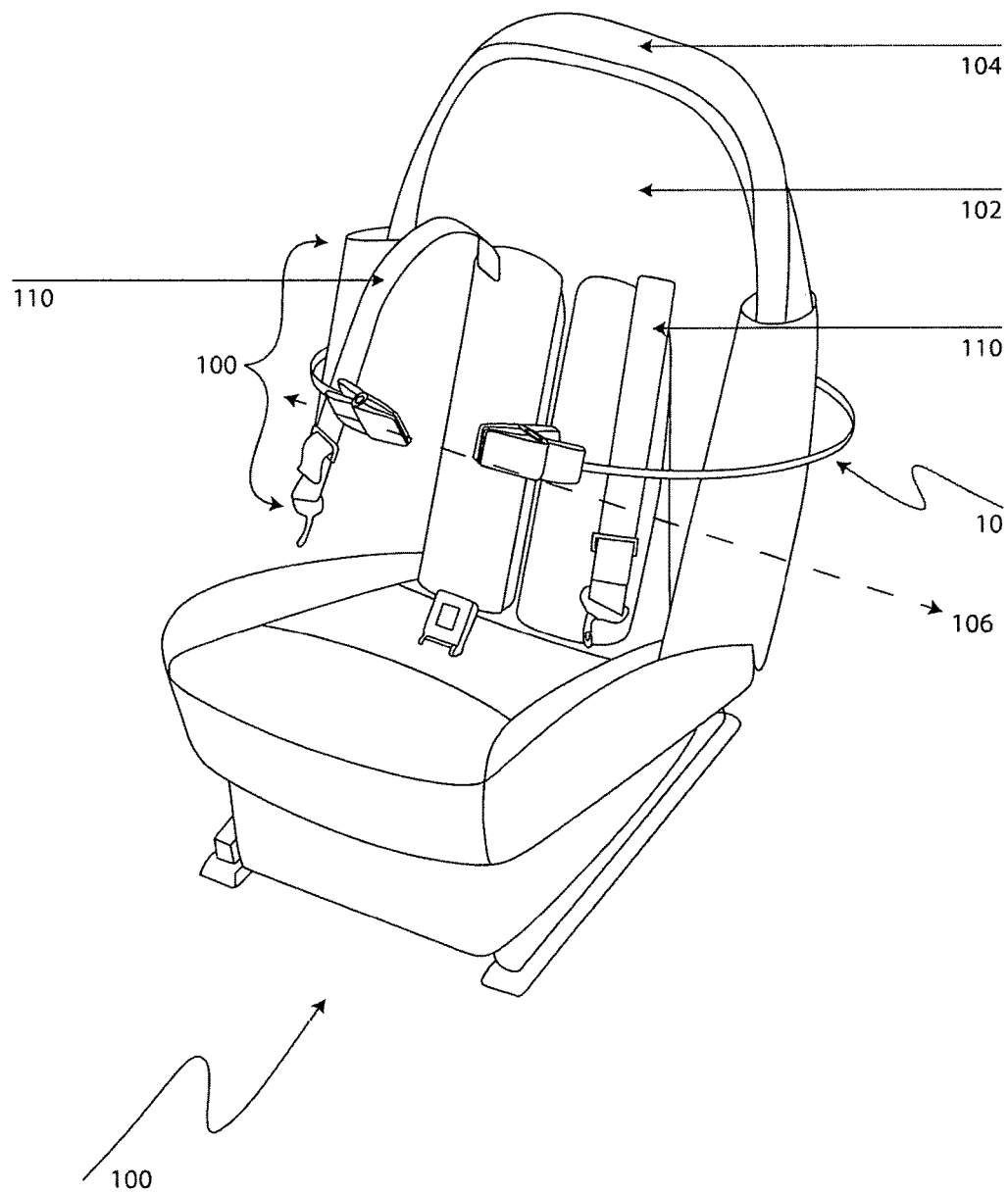
FIG. 7 and FIG. 8 are perspective views of the seatbelt holding clip of the preferred embodiment of the present invention shown in use with a child safety seat.
Figure 8:
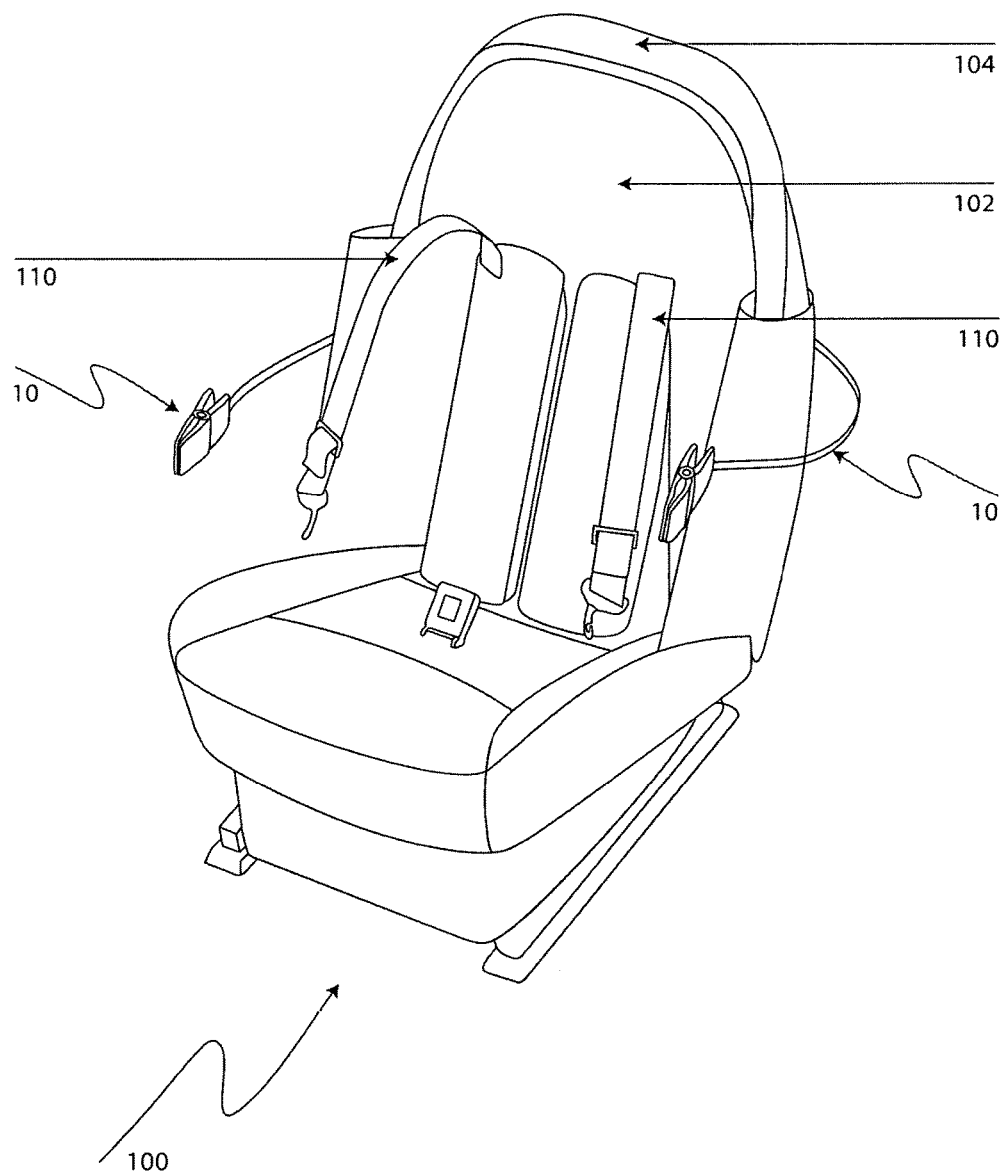

In operation and as best shown in conjunction with FIG. 7 and FIG. 8, in which the Seatbelt Holding Clip 10 of the present invention is shown in use in conjunction with an infant vehicle safety seat 100. The distal end 34 is attached to a backrest 102 of the car seat 100 at a positioned between a top 104 of the backrest 102 and a midpoint 106 of the backrest 102. Attachment may include the placement of the loop fastener element 41b by attaching the adhesive 41c to the rear of the backrest 102. Alternately, the distal end 34 may be attached to or integrated to the backrest 102 in any functionally equivalent manner. By providing attachment in such a position, the clamp 20 may be impinged to the restraining harness 110. Consequently, the tether 30 would maintain the restraining harness 110 a preferred pre-latched position that facilitates the easy installation of the harness 110 in a proper configuration in an efficient manner.

In yet another functionality the seat belt holding clip of the present invention may also be positioned underneath car seat in order to attach m id-clip (crotch clip) in an orientation out of the way of the seat in order to avoid undesired impingement when trying to place a child in a car seat correctly. Such a nuisance for parents and care givers is thereby avoided. In addition to use for infant car seats 100, the seat belt holding clip 10 of the present invention may be equivalently used with convertible car seats, booster seats, booster seats for adults and children of special needs, wheel chairs with harnesses, harnesses on high chairs, infant toys with harnesses, race cars and specialty cars with harnesses as well as aviation seats with harnesses or cross over straps which cross at the chest, and airplane seats for children that have harnesses.

Further still, the seatbelt holding clip 10 can be formed in various sized to be adapted for particular applications. While primarily used to hold back seat belts for infant carriers and car seats of different, adaptations of such a clip 10 may be adapted for use with infant/child strollers, kids toys which have harnesses and high chairs. As such, it is a mobile functioning tool to help parents or care givers to easily place individuals in to or out from seats that require harnesses in a manner such that the harness is positioned over the shoulder's to the center of the torso or chest in order to be buckled up.

Finally, in addition to such seatbelt and harness positioning, variations of the present device may be adapted for other household needs like organizing papers and keeping them clipped together. It could be of a smaller size, such as 1 inch, or a larger size such as inches depending on the adaptation that is intended.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A seatbelt holding clip comprising:
   a holding mechanism adapted for retention of a webbed belt and forming a clamping device assembly and further comprising:
     a first jaw member pivotally hinged to a second jaw by a pin which serves as a traverse hinge axis;
     each said jaw member forming a linear grasping member that is generally laterally elongated about a lateral axis and forming a gripping surface at an inward facing face;
     a biasing spring for providing an urging force for closing the first jaw member against the second jaw member; and
     a terminal distal edge having an overall perimeter including curved corners;
   a tether attached at a proximal end to said second jaw member; and an attachment mechanism affixed to a distal end of said tether, said attachment mechanism adapted to be attached to a backrest of a car seat at a positioned between a top of a backrest and a midpoint of the backrest such that a restraining harness may be tethered at a preferred pre-latched position that facilitates the easy installation of the harness in a proper configuration.

2. The seatbelt holding clip of claim 1, wherein each of said linear grasping members further comprises a grasping tab extending from and angularly disposed from a proximal end of said lateral axis.

3. A method for tethering a restraining harness comprising:
attaching a distal end of a tether of a seatbelt holding clip of claim 2 to a backrest of a car seat at a positioned between a top of a backrest and a midpoint of the backrest;
impinging a retaining harness web within the clamping device; and
positioning the restraining harness at a preferred a preferred pre-latched position that facilitates the easy installation of the harness in a proper configuration.

4. A method for tethering a restraining harness comprising:
attaching a distal end of a tether of a seatbelt holding clip of claim 2 to a harnessed seating device at a positioned between a top of a backrest and a midpoint of the backrest;
impinging a retaining harness web within the clamping device; and
positioning the restraining harness at a preferred pre-latched position that facilitates the easy installation of the harness in a proper configuration;
wherein said harnessed seating device is selected from a group comprising: child vehicle safety seats; child booster seats; adults booster seats; wheel chairs; high chairs; child riding toys; and aviation seats.

5. The seatbelt holding clip of claim 2, wherein each of said linear grasping members together to form a gripping clamp having resilient pads affixed at each of said gripping surface.

6. The seatbelt holding clip of claim 5, wherein each of said resilient pads is formed of a grip enhancing material.

7. The seatbelt holding clip of claim 6, wherein said grip enhancing material comprises rubber or foam.

8. The seatbelt holding clip of claim 7, wherein said biasing spring is embedded into the jaws through overmolding.

9. The seatbelt holding clip of claim 2, wherein each grasping tab further forms a thumb grip in which a grip enhancing surface is provided.

10. The seatbelt holding clip of claim 9, wherein said grip enhancing surface comprises knurling or protrusions as an aligned array of detentes, or indents, in linear, geometric or arcuate patterns.

11. The seatbelt holding clip of claim 9, wherein said grip enhancing surface further functions as a tactile indicator.

12. The seatbelt holding clip of claim 1, wherein said tether comprises a flexible restraint selected from a group consisting of: a webbing strap; an elastomeric cord or tape; rope; yarns, fibers or strands; bungee shock cord; three-strand combo; rope cargo net, polypropylene cord; and parachute cord.

13. The seatbelt holding clip of claim 12, wherein said proximal end is permanently attached to said second jaw member.

14. The seatbelt holding clip of claim 12, wherein said proximal end is removably attached to said second jaw member.

15. The seatbelt holding clip of claim 14, wherein said attachment mechanism provides an attachment surface for affixing to a target surface.

16. The seatbelt holding clip of claim 12, wherein said attachment mechanism comprises a hook and loop fastener element in which either a hook fastener portion or a loop fastener position is affixed to or integrated with the distal end.

17. The seatbelt holding clip of claim 1, wherein said first jaw member further comprises a functional appurtenance affixed to, positioned on, integrated with or interacting with an outer surface of the grasping member of the first jaw member.

18. The seatbelt holding clip of claim 17, wherein said functional appurtenance is selected from a group consisting of: decorative elements; images of licensed characters; noise makers; musical noise makers; and audio players.

\* \* \* \* \*